(12) United States Patent
Hosch et al.

(10) Patent No.: US 11,597,602 B2
(45) Date of Patent: Mar. 7, 2023

(54) CONVEYOR INCLUDING MODULAR FRAME AND SPINDLE ADJUSTMENT MECHANISM

(71) Applicant: Dorner Mfg. Corp., Hartland, WI (US)

(72) Inventors: Michael A. Hosch, Oconomowoc, WI (US); Scott Grahl, West Bend, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 17/580,714

(22) Filed: Jan. 21, 2022

(65) Prior Publication Data

US 2022/0242671 A1 Aug. 4, 2022

Related U.S. Application Data

(60) Provisional application No. 63/143,119, filed on Jan. 29, 2021.

(51) Int. Cl.
B65G 21/10 (2006.01)
B65G 23/44 (2006.01)
B65G 21/06 (2006.01)
B65G 21/14 (2006.01)

(52) U.S. Cl.
CPC ............ *B65G 21/10* (2013.01); *B65G 21/06* (2013.01); *B65G 21/105* (2013.01); *B65G 21/14* (2013.01); *B65G 23/44* (2013.01); *B65G 2207/30* (2013.01)

(58) Field of Classification Search
CPC .... B65G 21/10; B65G 23/44; B65G 2207/30; B65G 21/06; B65G 21/105; B65G 21/14

USPC ................... 198/860.1, 860.2, 813
See application file for complete search history.

(56) References Cited

U.S. PATENT DOCUMENTS

| 5,174,435 | A | 12/1992 | Dorner et al. | |
|---|---|---|---|---|
| 6,227,355 | B1 * | 5/2001 | White | B65G 15/62 198/841 |
| 6,422,382 | B1 | 7/2002 | Ertel et al. | |
| 7,681,719 | B2 * | 3/2010 | Hosch | B65G 47/66 198/841 |
| 9,617,078 | B2 * | 4/2017 | Hall | B65G 21/02 |
| 2001/0000595 | A1 * | 5/2001 | Eltvedt | B65G 21/06 198/816 |
| 2003/0183493 | A1 * | 10/2003 | Ertel | B65G 21/06 198/813 |
| 2011/0114457 | A1 * | 5/2011 | Ertel | B65G 21/02 198/860.1 |

(Continued)

FOREIGN PATENT DOCUMENTS

JP 3770331 B2 * 4/2006 ............. B65G 23/44

*Primary Examiner* — James R Bidwell
(74) *Attorney, Agent, or Firm* — Andrus Intellectual Property Law, LLP

(57) ABSTRACT

A conveyor construction for a continuous belt conveyor. The conveyor includes a conveyor frame assembly constructed from a plurality of separate extruded and joined frame sections. The frame assembly can include a pair of side frame extrusions joined to a center frame extrusion by a pair of attachment rails. The conveyor construction further includes a series of spindle mounting assemblies that support a tensioning spindle on opposite ends of the conveyor frame. Each of the spindle mounting assemblies includes a gear rack and a pinion head that is rotatable to move the gear racks. The gear racks contact one of a pair of head plates that support the tensioning spindle relative to the frame.

20 Claims, 7 Drawing Sheets

(56) References Cited

U.S. PATENT DOCUMENTS

2015/0259148 A1\* 9/2015 Hall .................. B65G 21/06
198/860.2

\* cited by examiner

CONVEYOR INCLUDING MODULAR FRAME AND SPINDLE ADJUSTMENT MECHANISM

CROSS REFERENCE TO RELATED APPLICATION

The present application is based on and claims priority to U.S. Provisional Patent Application Ser. No. 63/143,119, filed Jan. 29, 2021, the disclosure of which is incorporated herein by reference.

BACKGROUND

The present disclosure relates to conveyors having a conveyor frame, a pair of spindles and an endless conveyor belt. More specifically, the present disclosure relates to conveyors having an extended width and a tensioning spindle that is movable relative to the frame to adjust conveyor belt tension.

Known construction of an endless belt conveyor typically includes a frame assembly, a pair of head plates located at each end of the frame assembly, a spindle extending between each pair of head plates, and a conveyor belt engaged with the spindles. One of the spindles is drivingly interconnected with a motor, for rotating the spindle thereby to impart movement to the endless conveyor belt. The head plates are movably mounted to the frame assembly so as to provide selective adjustment of the position of the spindles, for providing proper belt tensioning and tracking. Such construction is illustrated in Dorner et al. U.S. Pat. Nos. 5,174,435 and 6,422,382, the disclosures of which is hereby incorporated by reference.

The conveyor constructions shown in the referenced prior art is a ladder-type construction consisting of a pair of side frame members interconnected together via a series of transversely extending cross members, each of which is connected at its ends to the side frame members. While this construction has been found to be highly satisfactory for both manufacturing and operational purposes, it involves certain drawbacks in overall part count and in assembly, in that the ladder-type frame construction is essentially a different subassembly for each available length of the conveyor frame assembly.

It is an object of the present disclosure to provide an endless belt conveyor construction which replaces the prior art ladder-type frame construction with a modular frame construction in which extruded frame elements are joined to each other to define the width of the conveyor frame, which lends itself to a reduced number of parts required for manufacturing conveyors of various lengths and which simplifies overall construction of the conveyor. It is a further object of the disclosure to provide a conveyor frame construction in which common components can be employed to manufacture conveyors of varying lengths in a relatively simple assembly process.

SUMMARY

The present disclosure relates to an endless belt conveyor having a frame, a pair of spindles and an endless conveyor belt. The conveyor frame is constructed from a plurality of frame extrusions that are joined to each other to create the conveyor width. A spindle mounting assembly is positioned on at least a first end and both sides of the conveyor frame to support a tensioning spindle while allowing longitudinal movement of the tensioning spindle relative to the conveyor frame to tighten or loosen the tension in the conveyor belt.

In one contemplated embodiment of the present disclosure, a conveyor frame assembly is constructed from a first side frame extrusion and a second side frame extrusion. Both of the first and second side frame extrusions extend between an attachment edge and a mounting edge. The first and second side frame extrusions each includes a top wall and a bottom wall that are joined by a plurality of support ribs. In one contemplated embodiment, the first and second side frame extrusions are identical and have the same configuration.

The conveyor frame assembly further includes a center frame extrusion that has a width between first and second side edges. A pair of attachment rails are include to join the center frame extrusion to both of the first and second side frame extrusions. In this manner, the conveyor frame assembly can be created by several separate extrusions joined to each other.

In another contemplated embodiment, a conveyor construction is provided that includes a conveyor a conveyor frame assembly including a pair of spaced apart mounting edges that each include an outer side wall and a recessed receiving slot. A top wall extends between the pair of spaced apart attachment edges of the conveyor frame. A pair of spindle mounting assemblies are movably mounted to a first end of the conveyor frame assembly. Each of the spindle mounting assemblies includes a head plate supported in contact with the outer side wall of the conveyor frame and a gear rack that is movably mounted within an axially extending passage formed in the conveyor frame assembly. The gear rack of the spindle mounting assembly is in contact with the head plate. A tensioning spindle is supported between the pair of spaced apart head plates such that the tensioning spindle moves with the head plates. A pair of pinions are joined to each other by a connection rod that extends across a width of the conveyor frame. Each of the pinions are engaged with one of the gear racks such that rotation of either one of the pinions results in movement of the gear racks and the head plates in contact with the gear racks. In this embodiment, each of the head plates are movable along an exterior surface of the outer side wall.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
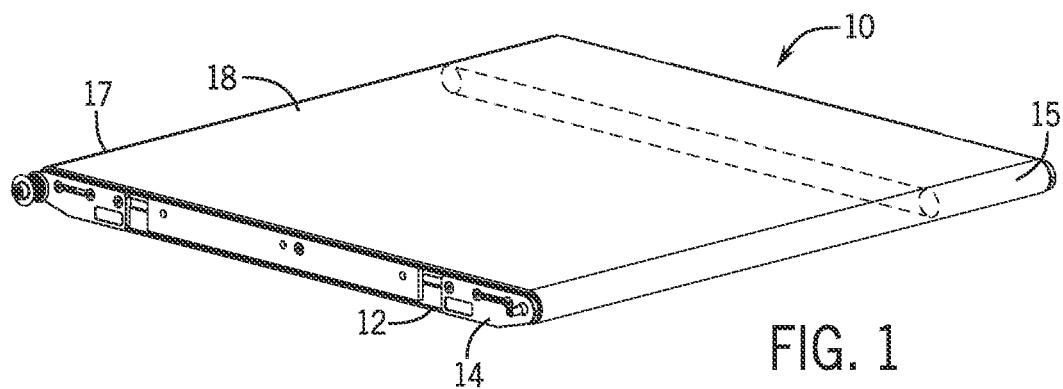
FIG. 1 is a perspective view of a conveyor assembly of the present disclosure.
Figure 2:
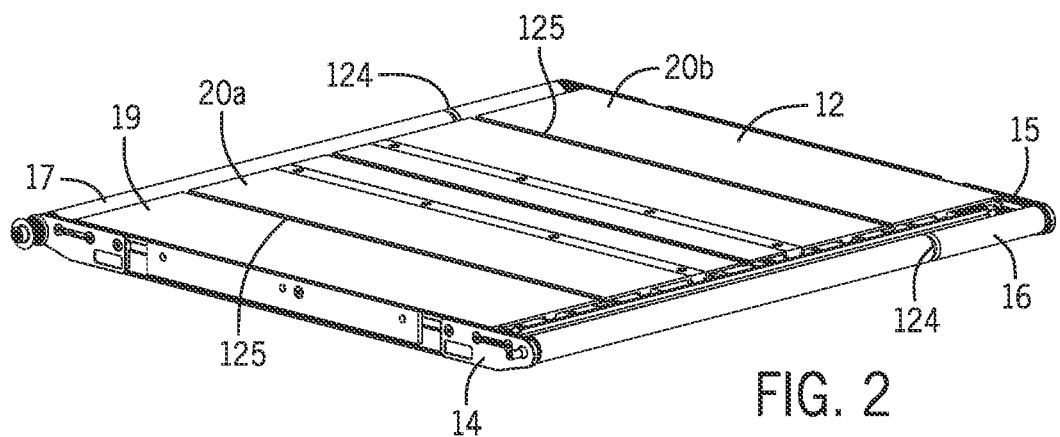
FIG. 2. is a perspective view similar to FIG. 1 with the conveyor belt removed.
Figure 3:
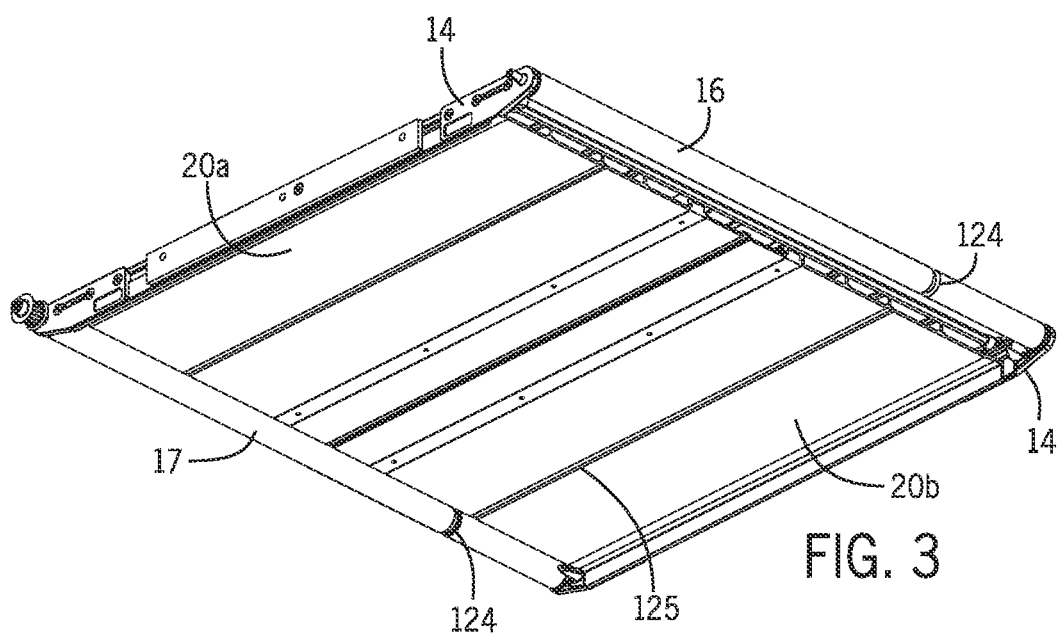
FIG. 3 is a bottom perspective view of the conveyor assembly with the conveyor belt removed.
Figure 4:
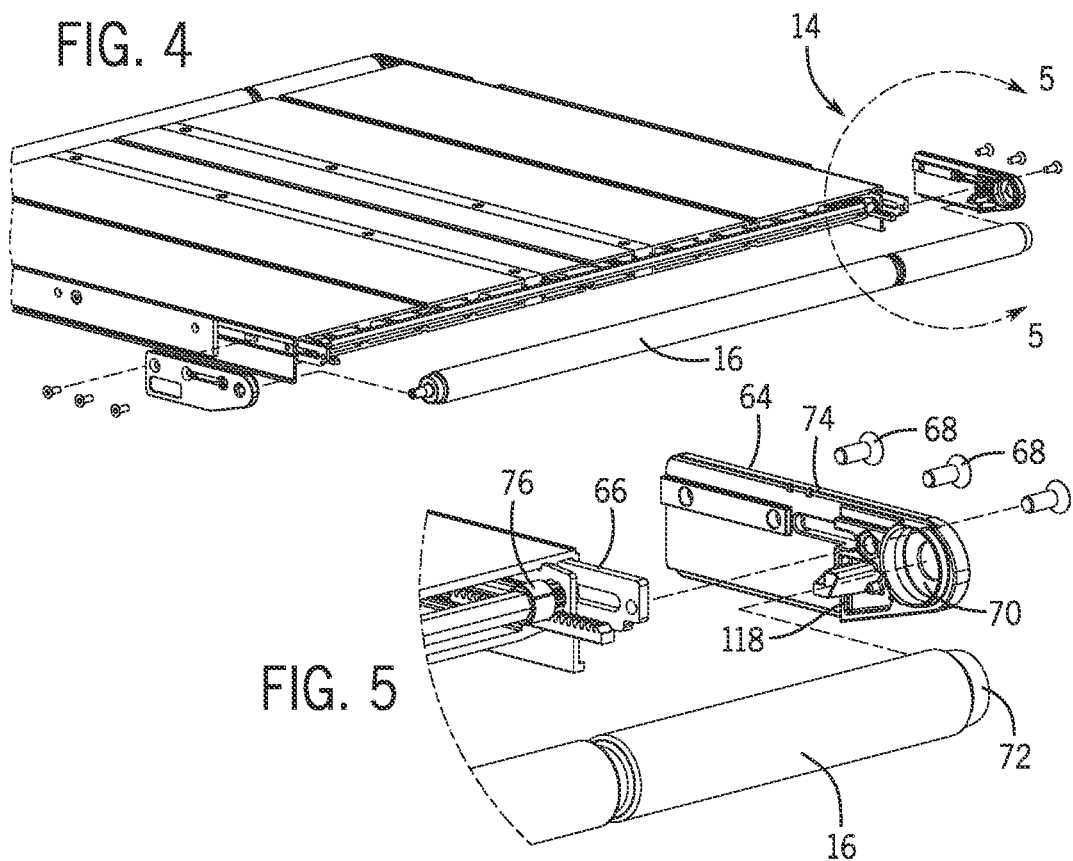
FIG. 4 is a partially exploded view of one end of the conveyor assembly of the present disclosure.

FIGS. 1-3 illustrate a conveyor assembly 10 constructed in accordance with the present disclosure. Generally, the conveyor assembly 10 includes a frame assembly 12, a pair of mirror image spindle mounting assemblies 14 mounted to a first end 15 of the frame assembly 12, a tensioning spindle 16 supported at the first end 15 and a drive spindle 17 mounted to and supported at a second end 19 of the conveyor assembly. The drive spindle 17 is connected to a motor to provide driven support of the drive spindle 17. An endless conveyor belt 18 is engaged between the pair of spindles 16, 17 and supported by the top support surface of the frame assembly 12. As will be described in greater detail below, the spindle mounting assemblies 14 are each movable along the longitudinal length of the frame assembly 12 to selectively tighten and loosen the conveyor belt 18 along the overall length of the conveyor assembly 10.

As illustrated in FIG. 2, the overall width of the conveyor frame assembly 12 in the embodiment illustrated is approximately 36 inches. As a result, extruding a single piece of aluminum that is 36 inches wide is impractical. For this reason, the conveyor frame assembly 12 shown in FIG. 2 is constructed from multiple extruded sections that are joined to each other to define the overall width of the frame assembly 12.

Figure 10:
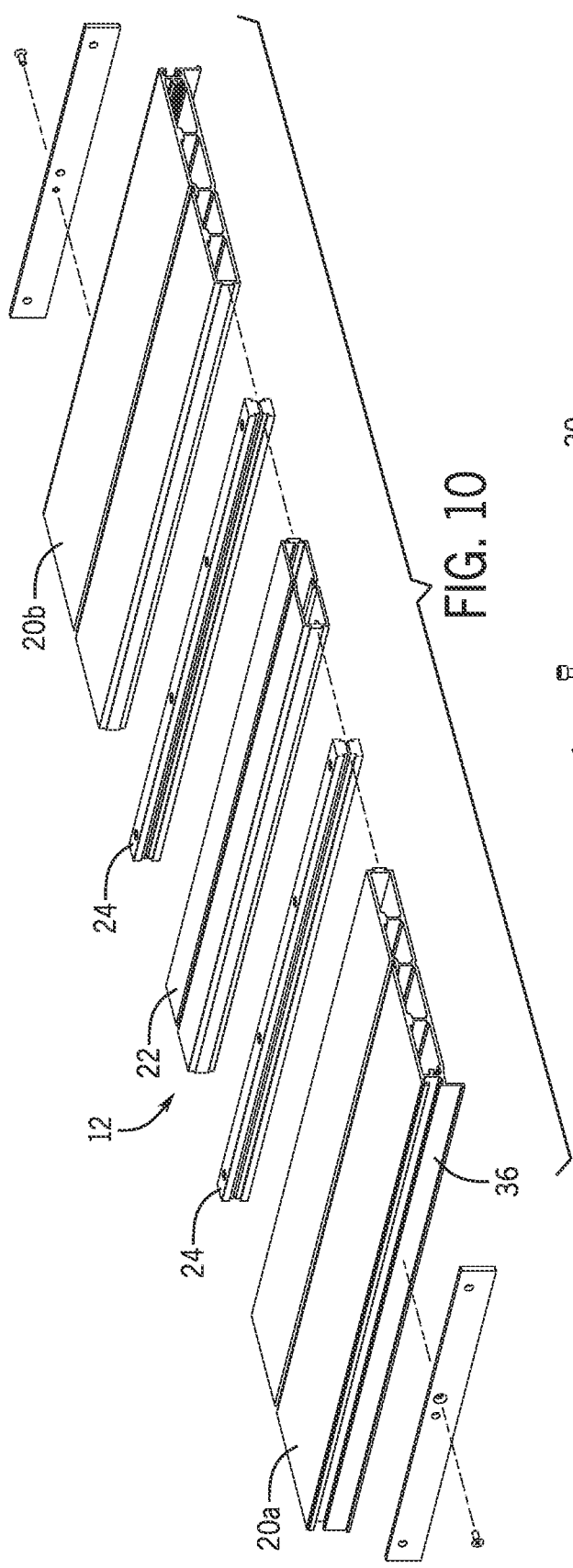
FIG. 10 is an exploded view of the conveyor frame assembly.

In the embodiment shown in FIG. 10, the frame assembly 12 includes a first side frame extrusion 20a and a second side frame extrusion 20b. The side frame extrusions 20a and 20b are identical extrusions formed from extruded aluminum and are simply rotated 180 degrees relative to each other during assembly of the conveyor frame assembly. In the embodiment illustrated, the width of each of the side frame extrusions 20a, 20b is approximately twelve inches. However, it should be understood that the width of the side frame extrusions 20a, 20b could be modified depending upon the desired configuration for the conveyor assembly.

In addition to the side frame extrusions 20a, 20b, the frame assembly 12 further includes a center frame extrusion 22. The center frame extrusion 22 is again formed from an extruded section of aluminum and has a width of approximately six inches, although other widths are certainly contemplated as being within the scope of the present disclosure. The center frame extrusion 22 is designed to be positioned between the pair of side frame extrusions 20a, 20b and joined to each of the side frame extrusions 20a, 20b through use of a pair of attachment rails 24. The attachment rails 24 are designed to extend along the entire longitudinal length of the conveyor frame assembly 12 and to join the center frame extrusion 22 to the pair of side frame extrusions 20a, 20b.

Figure 11:
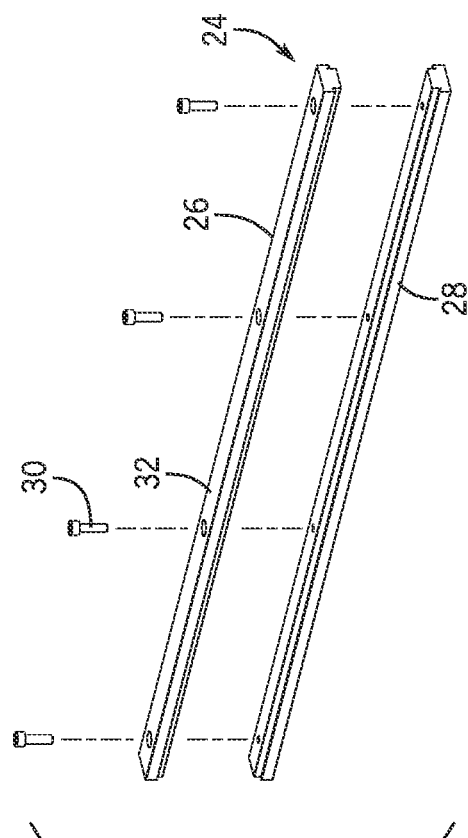
FIG. 11 is an exploded view of one of the attachment rails shown in FIG. 10.

As illustrated in FIG. 11, each of the attachment rails 24 includes a top portion 26 and a bottom portion 28 that are joined to each other by a series of connectors 30. The top and bottom portions 26, 28 are identical components that have the same cross section. The top and bottom portions 26, 28 are rotated 180 degrees relative to each other and are joined by the connectors 30. Each of the top and bottom portions includes a series of spaced attachment holes 32 sized and internally threaded to receive one of the plurality of connectors 30.

Figure 12:
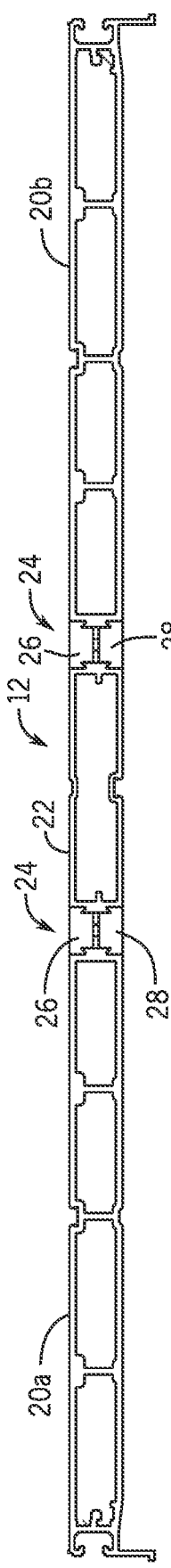
FIG. 12 is an end view of the joined conveyor frame extrusions in an assembled condition.

Referring now to FIG. 12, an end view of the assembled frame assembly 12 is illustrated. In this end view, the pair of attachment rails 24 are shown connecting the side frame extrusions 20a and 20b to the center frame extrusion 22. As can be understood in FIG. 12, the top portion 26 and the bottom portion 28 of each of the attachment rails 24 are joined to each other using the series of connectors 30 such that the attachment rails 24 securely connect the center frame extrusion 22 to the pair of side frame extrusions 20a and 20b.

Figure 12A:
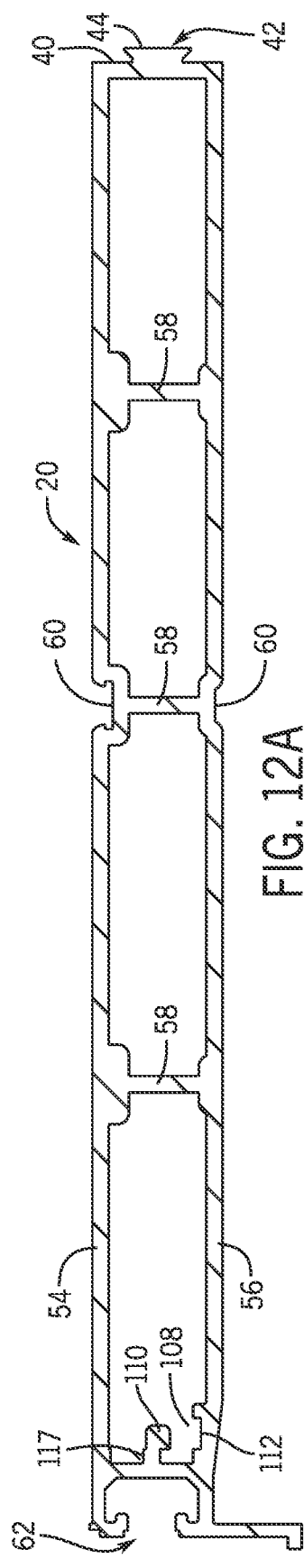
FIG. 12A is an end view of one of the side frame extrusions shown in FIG. 12.

As can be seen in FIG. 12A, an attachment edge 40 of each of the side frame extrusions 20a, 20b includes an attachment projection 42 that has an expanded width at its outer end 44 as compared to the reduced width of the attachment projection 42 connected to the attachment edge 40 of the side frame extrusion. The attachment projection 42 thus forms one half (tenon) of a dovetail joint with a corresponding notch included in the assembled attachment rail. As illustrated in FIG. 12B, the center frame extrusion 22 includes an identical attachment projection 42 on both the first edge 46 and the second edge 48 of the center frame extrusion 22.

Figure 12C:
FIG. 12C is an end view of one half of the attachment rail shown in FIG. 12.
Figure 12B:
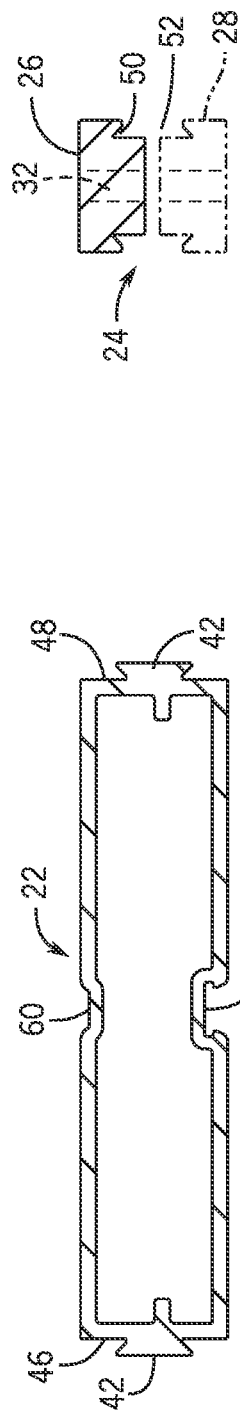
FIG. 12B is an end view of the center frame extrusion shown in FIG. 12.

FIG. 12C illustrates a section view of the top portion 26 of one of the attachment rails 24, where the bottom portion 28 is shown in phantom. As indicated previously, both the top portion 26 and the bottom portion 28 have an identical configuration and are simply inverted relative to each other to create the top and bottom portions 26 and 28. The top portion 26 includes a recessed channel 50 that when combined with the identical recessed channel formed in the bottom portion 28 creates a receiving groove 52 for use in the dovetail joint. As can be understood in FIG. 12, the combination of the receiving groove 52 created by the attachment rail 24 and the attachment projection 42 formed on the attachment edge 40 of each of the side frame extrusions 20 and on each of the first and second edges of the center frame extrusion 22 creates multiple dovetail joints to join the side frame extrusions 20a and 20b to the center frame extrusion 22. The dovetail joint between the extrusions allows the extrusions to be slid along the length of the attachment rails 24 during construction while preventing lateral separation. Alternatively, the attachment rails 24 can be constructed in place by attaching the top portion 26 to the bottom portion 28 through the use of the removable connectors 30 when the extrusions are positioned close to each other.

Referring back to FIG. 12A, each of the side frame extrusions 20 includes a top wall 54, a bottom wall 56 and a series of support ribs 58 spaced along the width of the side frame extrusion 20. The top wall 54 and the bottom wall 56 each include a recessed groove 60 that is designed to receive a guiding rib formed on the back side of a many conveyor belts. As shown in FIG. 12B, the center frame extrusion 22 also includes a pair of guide grooves 60 that can be used to perform the same function depending upon the conveyor configuration.

Referring back to FIG. 12A, each of the side frame extrusions 20a, 20b includes an mounting edge 62. The mounting edge 62 is designed to face outwardly from the frame assembly 12 while the attachment edge 40 is designed to be internal and joined to the center frame extrusion 22.

The details of the spindle mounting assemblies 14 for the tensioning spindle will now be described in greater detail with reference to FIGS. 4-9. Each of the pair of spindle mounting assemblies 14 is similar and the following description for one of the spindle mounting assemblies 14 will be equally applicable to each of the pair of spindle mounting assemblies 14 used at the first end 15 of the conveyor assembly and on each side of the conveyor frame.

Figure 5:
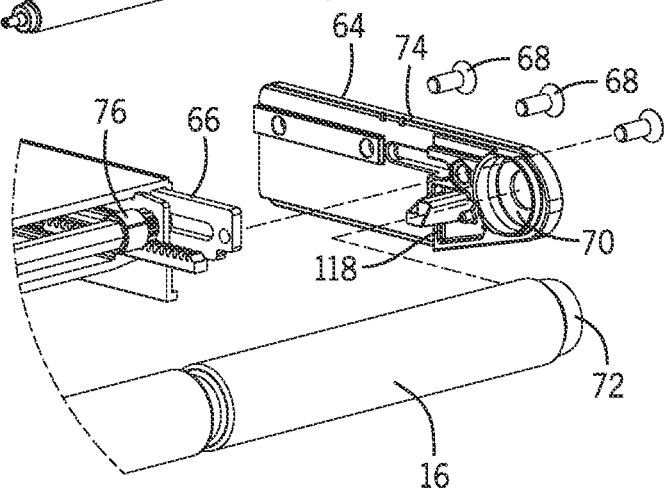
FIG. 5 is a magnified view taken along line 5-5 of FIG. 4.
Figure 6:
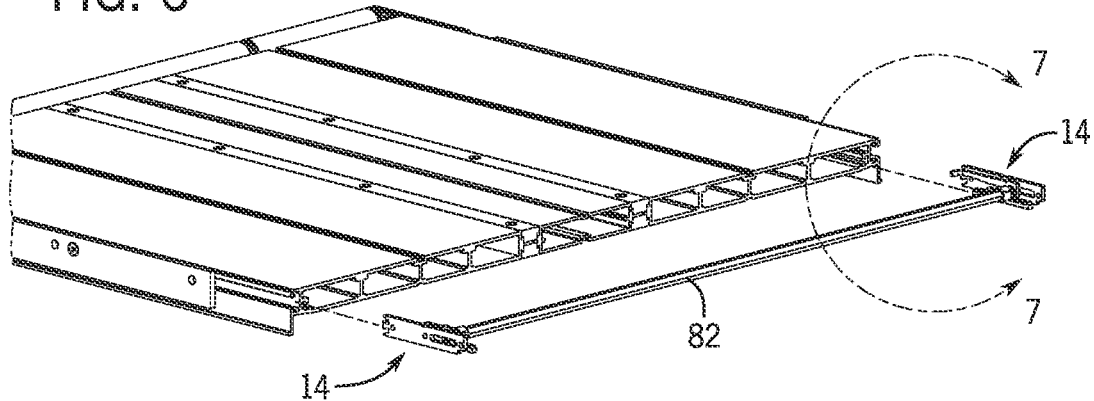
FIG. 6 is a partially exploded view of the conveyor assembly.

As can be seen in the magnified view of FIG. 5, the spindle mounting assembly 14 includes a movable head plate 64 that is designed to be connected to a movable retainer member 66 through a pair of connectors 68. The head plate 64 includes a receiving cup 70 that is designed to rotatably receive one end 72 of the tensioning spindle 16 such that the tensioning spindle 16 is freely rotatable relative to the head plate 64. Typically, each end 72 of the tensioning spindle 16 includes a bearing that allows for free rotation of the tensioning spindle 16 relative to the head plate 64. The head plate 64 includes an access slot 74 that allows access to a pinion head 76 when the spindle mounting assembly 14 is installed along the frame assembly.

Figure 9:
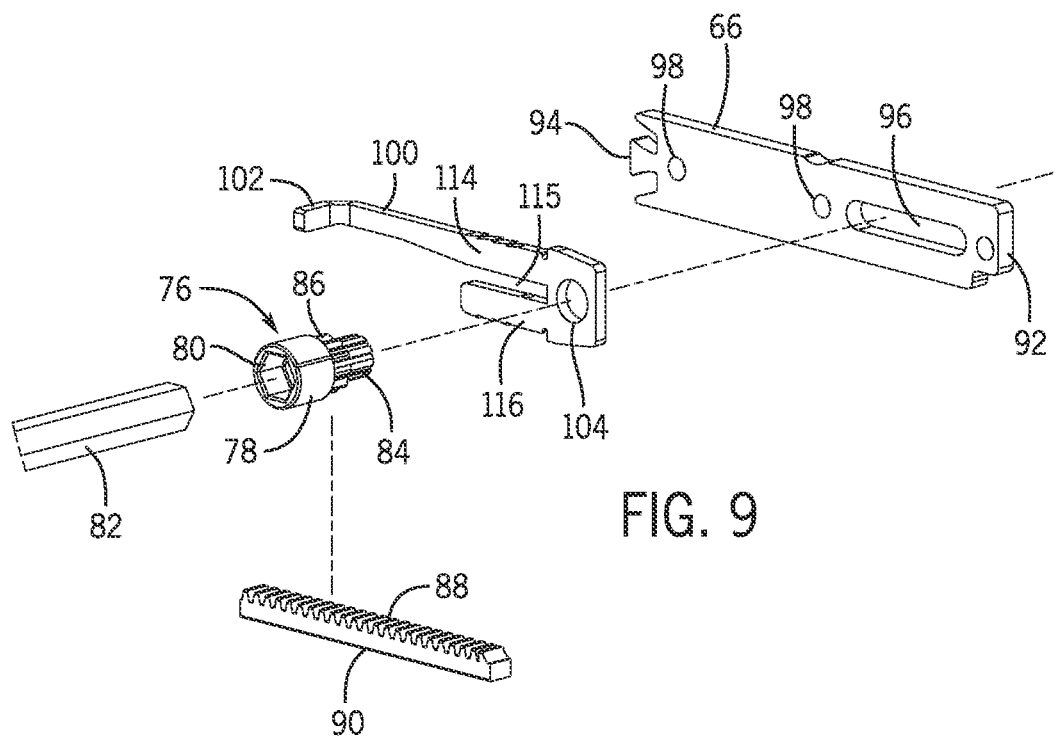
FIG. 9 is a magnified view taken along line 9-9 of FIG. 8.

The pinion head 76, as best shown in FIG. 9, includes a connecting portion 78 that includes a generally smooth outer surface and a receiving cavity 80. In the embodiment illustrated, the receiving cavity 80 includes six internal walls or facets that are configured to receive the hexagonal outer surface of a connecting rod 82. The flat surfaces of the receiving cavity prevent rotation of the pinion head 76 relative to the connecting rod 82.

In addition to the connecting portion 78, the pinion head 76 also includes a drive portion 84 that includes a series of teeth 86. The external teeth 86 formed on the drive portion 84 are designed to engage with a corresponding series of teeth 88 defined along the top surface of the gear rack 90. The gear rack 90 engages the teeth 86 in the drive portion 84 such that rotating movement of the pinion head 76 causes relative movement between the pinion head 76 and the gear rack 90.

FIG. 9 further shows the details of the retainer member 66. The retainer member 66 is generally formed as a metal plate extending between a first end 92 and a second end 94. The retainer member 66 includes an access slot 96 that generally corresponds to the similar access slot 74 formed in the head plate 64. The retainer member 66 further includes a pair of connector openings 98 that are designed to receive the connectors 68 shown in FIG. 5 to securely attach the retainer member 66 to the head plate 64.

The spindle mounting assembly further includes a movement limiting bracket 100. The movement limiting bracket 100 is a stationary bracket mounted to one of the side frame extrusions to support one of the pinion heads 76 and to limit the inward movement of the head plate and spindle relative to the frame assembly. The movement limiting bracket 100 includes a stop arm 102 on one of its ends and an access opening 104 on an opposite end. The access opening 104 provides access to the drive portion 84 of the pinion head 76 while allowing rotation of the pinion head 76 and also restricting the lateral movement of the pinion head 76 as will be described in greater detail below.

Figure 15:
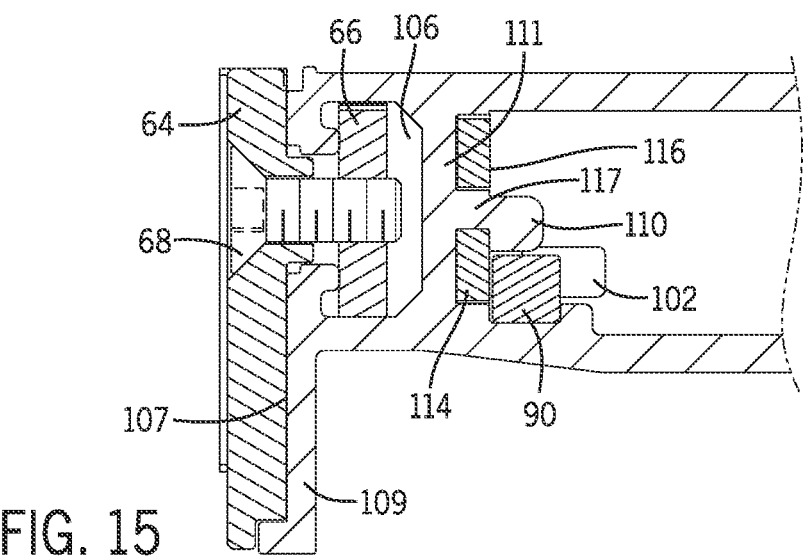
FIG. 15 is a section view taken along line 15-15 of FIG. 14

Referring back to FIG. 7, the retainer member 66 is received within a T-slot 106 formed in the mounting edge 62 of the side frame extrusion 20. As shown in FIG. 15, the head plate 64 is supported along and contacts an outer surface 107 of the sidewall 109. The head plate 64 is joined to the retainer member 66 through the series of connectors 68. The retainer member 66 is shown received within the T-slot 106 that is defined at an inner end by the back wall 111. The retainer member 66 is designed to be movable along the longitudinal length of the frame assembly with the attached head plate 64.

Figure 7:
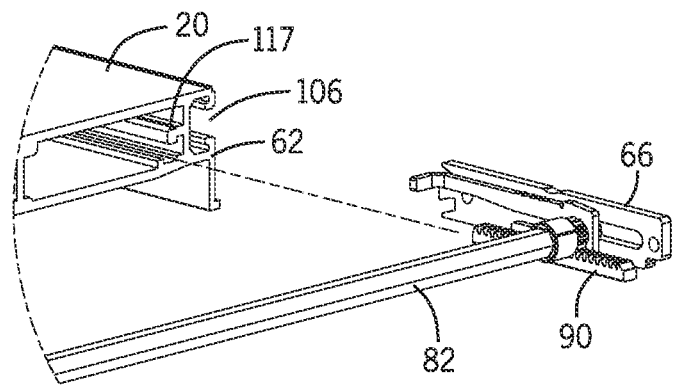
FIG. 7 is a magnified view taken along line 7-7 of FIG. 6.

Referring now to FIGS. 7 and 15, when the spindle mounting assemblies are installed, the gear rack 90 is received within an area 108 between an upper finger 110 and a lower wall 112 of the side frame extrusion, which are best shown in FIG. 12A. As shown in FIG. 9, the movement limiting bracket 100 includes an open passageway 115 formed between a first arm 114 and a second arm 116. The open passageway receives the rib wall 117 that includes the finger 110 shown in FIGS. 12A and 15. Specifically, the first arm 114 is received above the finger 110 while a second arm 116 is positioned below the rib wall 117 and finger 110. The receipt of the rib wall 117 within the open passageway 115 prevents movement of the movement limiting bracket 100.

Figure 8:
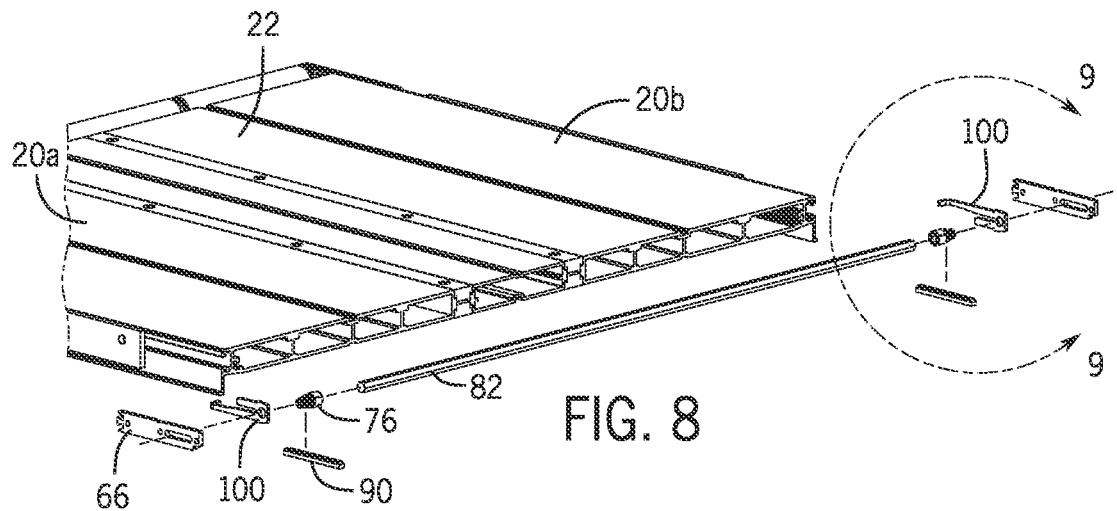
FIG. 8 is an exploded view of the components of the conveyor assembly shown in FIG. 6.

As shown in FIG. 8, on one side of the conveyor assembly, the movement limiting bracket 100 is inverted relative to the other side of the conveyor assembly. In the side shown in FIG. 15, the first arm 114 including the stop arm 102 is below the rib wall 117 such that the stop arm 102 provides a movement limiting stop for the gear rack 90, as shown in FIG. 15.

Figure 13:
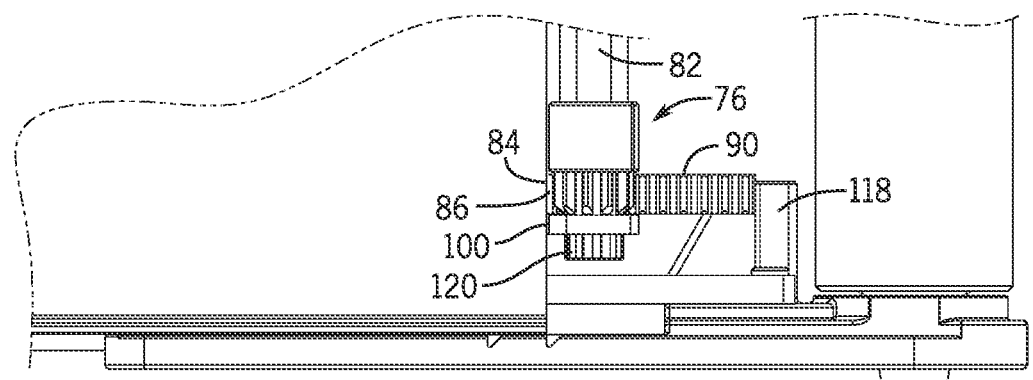
FIG. 13 is a partial top view of the spindle mounting assembly mounted to the frame assembly.
Figure 14:
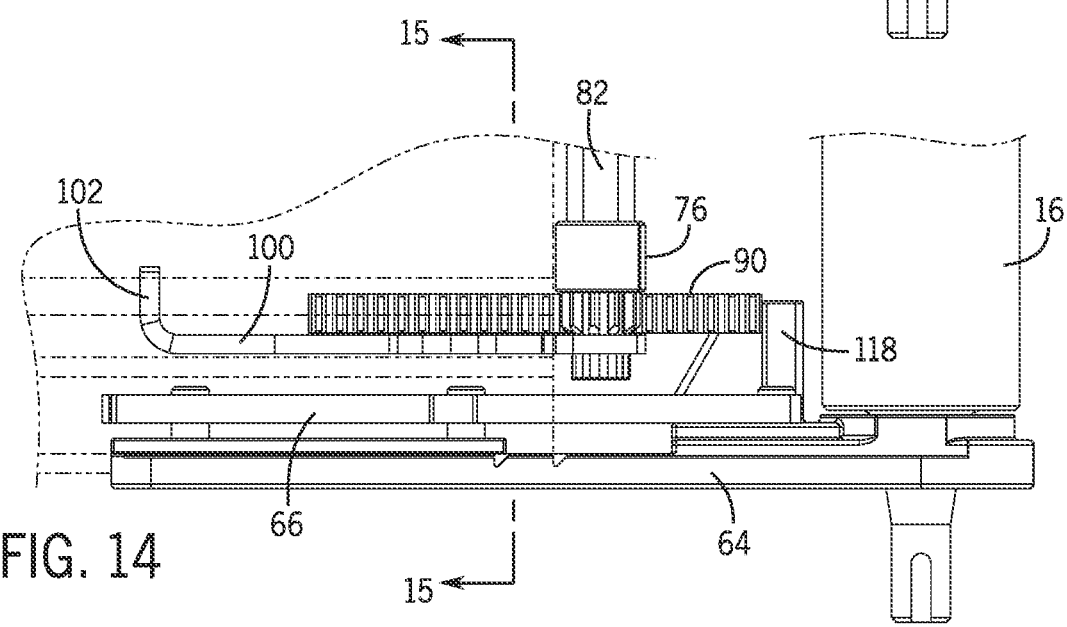
FIG. 14 is a view similar to FIG. 13 with components hidden to illustrate the mounting of the spindle mounting assembly to the frame assembly.

Referring now to FIG. 13, the interaction between the pinion head 76 and the gear rack 90 is illustrated. One end of the gear rack 90 engages and is supported on an engagement ear 118 that extends inwardly from the head plate 64, as can also be seen in FIG. 5. The engagement ear 118 thus allows the head plate 64 to move with the movement of the gear rack 90. As shown in FIG. 13, the teeth 86 on the drive portion of the pinion head 76 engage corresponding teeth on the gear rack 90. The outer end 120 of the drive portion 84 extends past the movement limiting bracket 100. As discussed above, the movement limiting bracket 100 is a stationary element and thus prevents any longitudinal movement of the pinion head 76.

Figure 16:
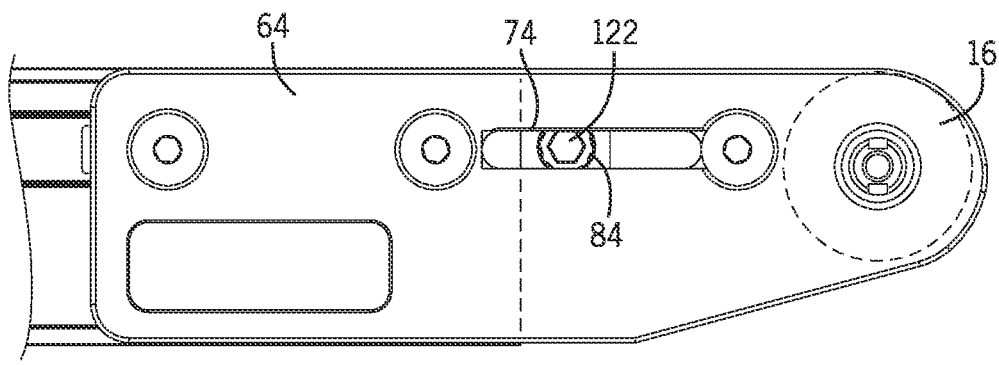
FIG. 16 is a side view showing the spindle mounting assembly positioned on the frame assembly.

As illustrated in FIG. 16, the drive portion 84 of the pinion head includes a drive opening 122 that is accessible through the access slot 74 formed in the head plate 64. A user can selectively insert a tool into the drive opening 122 to selectively rotate the pinion head 76 when it is desired to adjust the position of the tensioning spindle 16 to add or remove tension from the conveyor belt.

Figure 17A:
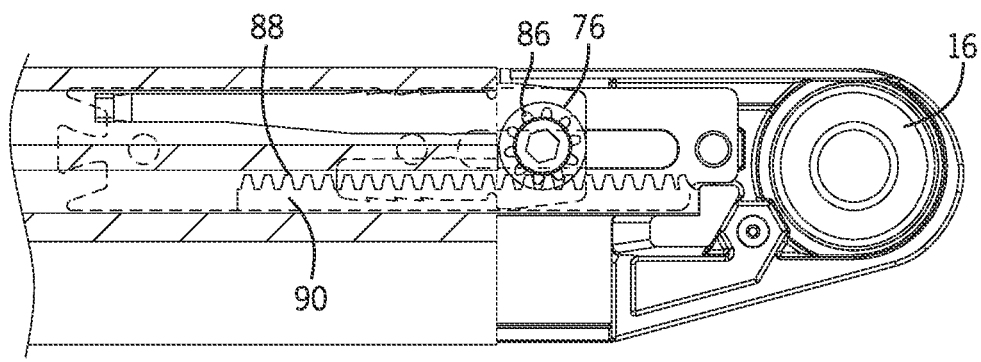
FIG. 17A is a side view similar to FIG. 16 with components hidden to show the interaction between the pinion and rack system.
Figure 17B:
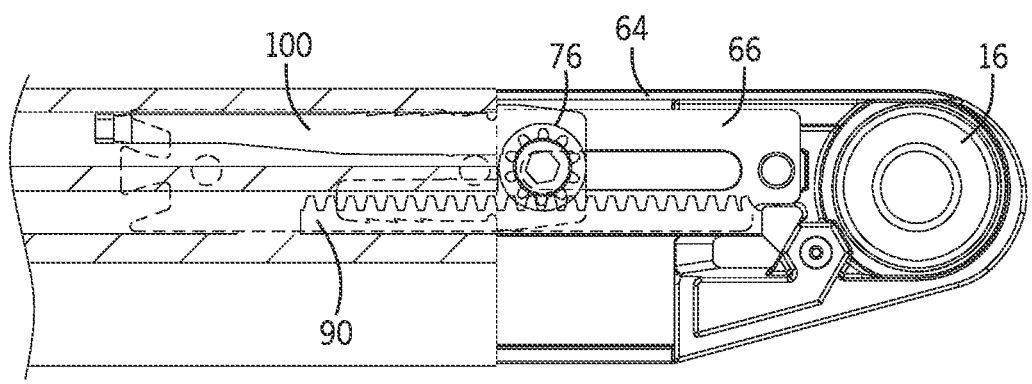
FIG. 17B is a side view similar to FIG. 17 showing the movement of the spindle mounting assembly.

FIGS. 17A and 17B illustrate the adjustable movement of the tensioning spindle 16 through selective rotation of the pinion head 76. As shown in the view of FIG. 17A, the individual teeth 86 engage the teeth 88 on the gear rack 90. When the pinion head 76 is rotated in a counterclockwise direction, the rotation of the pinion head causes the gear rack 90 to move away from the conveyor frame, thus causing the extension of the tensioning spindle 16 away from the conveyor frame to tighten the conveyor belt. Such movement is driven by movement of the gear rack 90, the retainer member 66 and the head plate 64. As can be seen in the comparison of FIGS. 17A and 17B, the movement limiting bracket 100 remains stationary while the components of the spindle mounting assembly move relative to the stationary frame and movement limiting bracket 100.

If the tensioning spindle is to be retracted from the position in FIG. 17B to reduce tension on the conveyor belt, the pinion head 76 is rotated in a clockwise direction resulting in the retraction of the tensioning spindle 16 caused by the tension in the conveyor belt. The retraction of the tensioning spindle 16 pushes the gear rack 90 back into the conveyor frame, such as can be seen in the comparison of FIG. 17A relative to FIG. 17B. The stop arm 102 on the movement limiting bracket 100 limits the amount of movement of the gear rack 90 as discussed previously.

Referring back to FIGS. 2 and 3, the tensioning spindle 16 and the drive spindle 17 in the exemplary embodiment shown each include a single alignment slot 124. The alignment slot 124 is formed off center from the middle of the respective spindle. Instead, the alignment slot 124 is centered along the one of the side frame extrusions 20a or 20b. The side frame extrusions 20a and 20b are identical extrusions that each include a recessed slot 125 formed in both the top and bottom walls of the extrusion. Since the conveyor assembly is designed to have a configurable width by connecting multiple extrusions, the alignment slot 124 is designed to align with the recessed alignment slot 125 formed in one of the multiple extrusions. In the embodiment illustrated, the alignment slot 124 is shown aligned with the recessed alignment slot 125 in the right side frame extrusion 20b. However, the spindles could be oriented such that the alignment slot 124 would be aligned with the recessed slot in the left side frame extrusion 20a.

The alignment slot 124 on each of the spindle and the recessed slot 125 are each designed to receive a rib on an inner surface of the conveyor belt to help track the conveyor belt during operation of the conveyor assembly. The offset location of the alignment slot 124 relative to the center of the conveyor frame reduces any forces placed on the spindle by the moving conveyor belt over the expanded width of the conveyor frame.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A conveyor frame assembly, comprising:
a first side frame extrusion having a width extending between an attachment edge and a mounting edge, the first side frame extrusion including a top wall and a bottom wall joined by a plurality of support ribs;
a second side frame extrusion having a width extending between an attachment edge and a mounting edge, the first side frame extrusion including a top wall and a bottom wall joined by a plurality of support ribs;
a center frame extrusion having a width extending between a first side edge and a second side edge, the center frame extrusion including a top wall and a bottom wall; and
a pair of attachment rails,
wherein the attachment edge of the first side frame member is joined to the first side edge of the center frame extrusion by one of the pair of attachment rails and the attachment edge of the second side frame member is joined to the second side edge of the center frame extrusion by another of the pair of attachment rails.

2. The conveyor assembly of claim 1 wherein the attachment edge of both the first side frame extrusion and the second side frame extrusion and both the first and second side edges of the center frame extrusion include an attachment projection and each of the pair of attachment rails includes a pair of spaced grooves each configured to mate with one of the attachment projections.

3. The conveyor assembly of claim 2 wherein each of the pair of attachment rails is formed from a top portion and a bottom portion joined by a plurality of connectors.

4. The conveyor assembly of claim 3 the top portion and the bottom portion of each attachment rail combine to form the grooves on sides of the attachment rail.

5. The conveyor assembly of claim 1 wherein the width of the first side frame extrusion and the width of the second side frame extrusion are the same.

6. The conveyor assembly of claim 5 wherein the width of the center frame extrusion is less than the width of the first and second side frame extrusions.

7. A conveyor construction, comprising:
a conveyor frame assembly including a pair of spaced apart mounting edges that each include an outer side wall and a recessed receiving slot;
a top wall extending between the pair of spaced apart attachment edges;
a pair of spindle mounting assemblies movably mounted to a first end of the conveyor frame assembly, each of the spindle mounting assemblies including a head plate supported in contact with the outer side wall and a gear rack movably mounted within an axially extending passage formed in the conveyor frame assembly, the gear rack being in contact with the head plate;
a tensioning spindle supported between the pair of spaced apart head plates; and
a pair of pinions joined to each other by a connection rod extending across a width of the conveyor frame, wherein each of the pinions are engaged with one of the gear racks such that rotation of either one of the pinions results in movement of the gear racks and the head plates in contact with the gear racks.

8. The conveyor construction of claim 6 wherein the head plate is movable along an exterior surface of the outer side wall.

9. The conveyor construction of claim 6 wherein each of the pair of spindle mounting assemblies includes holding plate positioned within the recessed receiving slot and connected to the head plate such that the head plate is supported along the recessed receiving slot by the holding plate.

10. The conveyor construction of claim 6 wherein each of the recessed receiving slots is formed between an internal back wall and the outer side wall.

11. The conveyor construction of claim 10 wherein each of the pair of spindle mounting assemblies includes a stationary retainer member positioned internally from the back wall and configured to rotatably supports one of the pinions.

12. The conveyor construction of claim 11 wherein the stationary retainer includes a stop arm that contacts the gear rack to limit of movement of the gear rack in at least one direction.

13. The conveyor construction of claim 11 wherein the stationary retainer member contacts a rib wall extending perpendicular to the back wall.

14. A conveyor assembly comprising:
- a first side frame extrusion having a width extending between an attachment edge and a mounting edge, the first side frame extrusion including a top wall and a bottom wall joined by a plurality of support ribs;
- a second side frame extrusion having a width extending between an attachment edge and a mounting edge, the first side frame extrusion including a top wall and a bottom wall joined by a plurality of support ribs, wherein the attachment edges of the first and second extrusions each include an outer side wall and a recessed receiving slot;
- a center frame extrusion having a width extending between a first side edge and a second side edge, the center frame extrusion including a top wall and a bottom wall;
- a pair of attachment rails, wherein the attachment edge of the first side frame member is joined to the first side edge of the center frame extrusion by one of the pair of attachment rails and the attachment edge of the second side frame member is joined to the second side edge of the center frame extrusion by another of the pair of attachment rails;
- a pair of spindle mounting assemblies movably mounted to a first end of the conveyor frame assembly, each of the spindle mounting assemblies including a head plate supported in contact with the outer side wall and a gear rack movably mounted within an axially extending passage formed in the conveyor frame assembly, the gear rack in contact with the head plate;
- a tensioning spindle supported between the pair of spaced apart head plates; and
- a pair of pinions joined to each other by a connection rod extending across a width of the conveyor frame, wherein each of the pinions are engaged with one of the gear racks such that rotation of either one of the pinions results in movement of the gear racks and the head plates in contact with the gear racks.

15. The conveyor assembly of claim 14 wherein the attachment edge of both the first side frame extrusion and the second side frame extrusion and both the first and second side edges of the center frame extrusion include an attachment projection and each of the pair of attachment rails includes a pair of spaced grooves each configured to mate with one of the attachment projections.

16. The conveyor assembly of claim 15 wherein each of the pair of attachment rails is formed from a top portion and a bottom portion joined by a plurality of connectors.

17. The conveyor assembly of claim 14 wherein each of the pair of spindle mounting assemblies includes holding plate positioned within the recessed receiving slot and connected to the head plate such that the head plate is supported along the recessed receiving slot by the holding plate.

18. The conveyor assembly of claim 14 wherein each of the recessed receiving slots is formed between an internal back wall and the outer side wall and each of the pair of spindle mounting assemblies includes a stationary retainer member positioned internally from the back wall and configured to rotatably supports one of the pinions.

19. The conveyor assembly of claim 14 wherein the tensioning spindle includes a recessed alignment slot that is spaced from a center of the tensioning spindle.

20. The conveyor assembly of claim 19 wherein the width of the first side frame extrusion and the width of the second side frame extrusion are the same and each of the first and second side frame extrusions includes a recessed slot formed in at least the top wall, wherein the recessed alignment slot is aligned with the recessed slot when the tensioning spindle is mounted between the pair of head plates.

* * * * *